United States Patent Office 3,322,744
Patented May 30, 1967

3,322,744
POLYMERS CONTAINING POLYFLUORONITROSO COMPOUNDS AND 1,1-DIFLUOROALLENES
Robert Neville Haszeldine, Windyridge, Lyme Road, Disley, England; Ronald Eric Banks, 187 Kingsway, Burnage, Manchester, England; and David Robin Taylor, 52 Adelaide Road, Bramhall, England
No Drawing. Filed Aug. 20, 1964, Ser. No. 390,990
6 Claims. (Cl. 260—92.1)

This invention relates to fluorinated polymers and is particularly concerned with polymers obtained by reaction of polyfluoronitroso compounds with 1,1-difluoroallenes.

In accord with the present invention, polymers are provided which result from reaction of polyfluoronitrosoalkanes or polyfluoronitrosoarenes with a 1,1-difluoroallene of the formula $CF_2:C:CRR'$ in which each of R and R' is a hydrogen or halogen atom or a polyfluoroalkyl (including perfluoroalkyl), alkyl, aryl, polyfluoroaryl (including perfluoroaryl), nitro, cyano, carboalkoxy, alkoxy or carboxy radical. The invention also embodies the inclusion of a fluoroolefin to form terpolymers.

The polyfluoronitrosoalkanes used for forming polymers in accordance with the present invention are of the formula R"NO where R" contains up to ten carbon atoms and is a member of the group consisting of perfluoroalkyl, chlorofluoroalkyl, hydrofluoroalkyl and hydrochlorofluoroalkyl radicals in which at least one of the halogen atoms in said R"NO compound (i.e., a fluorine or chlorine atom) is attached to the carbon atom adjacent to the nitroso group. Suitable perfluoronitrosoalkanes are $CF_3NO$, $n-C_3F_7NO$, $n-C_7F_{15}NO$, $$(CF_3)_2CFNO$$

and $(CF_3)_3CNO$. Suitable polyfluoronitrosoalkanes are $CF_2Cl \cdot CFCl \cdot NO$, $CH_3 \cdot CF_2 \cdot NO$, $CHF_2 \cdot CF_2 \cdot NO$ and $CHFCl \cdot CF_2NO$. R"NO may also be a polyfluoronitrosoarene of the formula ArNO in which Ar is a perfluoroaryl group that is unsubstituted or one that contains from one to three alkyl, polyfluoroalkyl (including perfluoroalkyl), polyfluoroaryl (including perfluoroaryl), or chlorine substituents, e.g. $C_6F_5NO$, $CF_3 \cdot C_6F_4 \cdot NO$, $C_6F_4ClNO$, $(CH_3)_2C_6F_3 \cdot NO$, $C_6F_5C_6F_4NO$ and the like.

The polymerization reaction is desirably carried out at a temperature of −40° to +100° C., the preferred temperature range being from −20° to +20° C., with the reaction pressure desirably being from 0.25 to 50 atmospheres, preferably 1 to 20 atmospheres. It is preferable that a 1:1 ratio of reactants be used, since in this case the polymer produced will be of high molecular weight. However, the molar ratio of nitroso to fluoroalkene reactants can vary from 10:1 to 1:10. The reaction can be carried out in a solvent such as perfluoro-n-pentane or perfluorotributylamine and it will be understood that a solvent is required when the monomers are solids at the chosen reaction temperatures.

The use of a polymerization initiator, although not an essential feature of the invention, has the advantage that the rate of copolymerization is considerably increased. Such initiators should be of the type that generate free radicals, e.g. organic peroxides and azo compounds and aqueous inorganic persulfates.

The polymers produced in accordance with the invention are illustrated by the repeating backbone comprising the units:

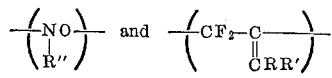 and 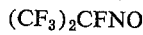

and these units will appear in the polymer backbone predominantly as alternating units. It will be understood that the repeating units may be of the formula

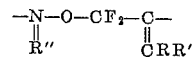

as well as those of the formula

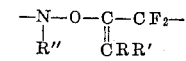

and a single molecule may contain both types of units.

When the polymer is a terpolymer obtained by including a fluoroolefin reactant, the formula is:

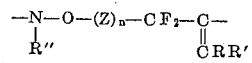

where Z is the fluoroolefin.

The polymers resist degradation at high temperatures and may be used as lubricants and in certain cases as greases, waxes and elastomers. Of particular importance is the fact that the polymers of the invention contain unsaturated side chains and therefore they can be cross-linked, thus improving their mechanical properties. The cross-linked polymers also have improved chemical properties, as for example, marked increase in solvent resistance and resistance to swelling caused by contact with organic solvents.

Cross-linking can be effected by conventional means, e.g. by diols, diamines, sulfur compounds, or free-radical cross-linking agents. The polymers thus have appreciable advantages over polymers produced from polyfluoronitroso compounds and fluorinated mono-olefins, which are saturated and therefore difficult to cross-link.

The following examples illustrate the invention. The temperatures are given on the centigrade scale. The words "Dreadnought" and "Pyrex" are trademarks referring to types of glass reaction vessels.

Example 1

Trifluoronitrosomethane (1.85 g., 18.7 millimole) and tetrafluoroallene (2.09 g., 18.7 millimole) were sealed, in vacuo in a 90 ml. Dreadnought glass tube (calculated initial pressure: ca. 9 atm.) and kept at −10° for 3 weeks. A translucent elastomeric gum (3.14 g., 81% yield) was obtained, which gave a clear solution in perfluoro-n-pentane.

Analysis.—Found: percent C, 22.5; percent N, 6.6. A 1,1 copolymer of structure $[CF_3 \cdot NO \cdot C_3F_4]_n$ requires percent C, 22.7; percent N, 6.6.

Example 2

When the mixture containing equimolar amounts of trifluoronitrosomethane and tetrafluoroallene was heated in a sealed Pyrex glass tube at 56° for 10 days a 1:1 copolymer was obtained in 30% yield.

Example 3

Trifluoronitrosomethane (21.1 g., 0.2132 mole) and tetrafluoroallene (2.98 g., 0.0355 mole) were heated together in an autoclave for 3 days at 65°. An opaque viscous oil (1.02 g.) was obtained.

Example 4

Instead of using trifluoronitrosomethane in Example 1, n-perfluoronitrosoheptane may be used to yield a similar polymeric product.

Example 5

Instead of using perfluoroallene in Example 1, 1,1-difluoroallene may be used to give a polymeric product.

In like manner, polymers are obtained by reacting 1,1-di-fluoro-3-nitroallene with t-perfluoronitrosobutane; 1,1-di-fluoro-3-phenyl-allene with perfluoronitrosobenzene; 1,1-di-fluoro-3-carboxy-allene with p-perfluoronitrosotoluene; and 1,1-fluoro-3-methoxy-allene with 1,2-difluoro-1,2-dichloronitrosoethane.

We claim:
1. Fluorine-containing polymers having a backbone essentially consisting of the units

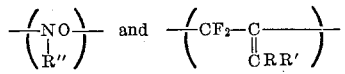

where R and R' is a member selected from the group consisting of hydrogen, halogen, nitro, cyano, carboalkoxy, alkoxy, carboxy, alkyl, aryl, polyfluoroalkyl, and polyfluoroaryl, said member having up to ten carbon atoms and R'' is a member selected from the group of perfluoroalkyl, chlorofluoroalkyl, hydrofluoroalkyl, hydrochlorofluoroalkyl and polyfluoroaryl, said R'' containing up to ten carbon atoms and having at least one halogen atom of said R'' group attached to the carbon atom adjacent the nitroso group.

2. A polymer according to claim 1 wherein R'' has at least one fluorine atom attached to the carbon atom adjacent the nitroso group.

3. A polymer having repeating units consisting of a 1,1-difluoroallene moiety having the structure

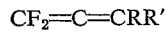

and a polyfluoronitroso moiety having the structure R''NO, said repeating units having the configurations

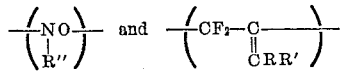

where R and R' are selected from the group consisting of hydrogen, halogen, nitro, cyano, carboalkoxy, alkoxy, carboxy, alkyl, aryl, polyfluoroalkyl, and polyfluoroaryl, and R'' is a member selected from the group of perfluoroalkyl, chlorofluoroalkyl, hydrofluoroalkyl and hydrochlorofluoroalkyl, said R'' containing up to ten carbon atoms and having at least one fluorine atom attached to the carbon atom adjacent the nitroso group.

4. A polymer as in claim 3 where the repeating units are derived from perfluoroallene and trifluoronitrosomethane.

5. The process of preparing a fluorine-containing copolymer which comprises contacting a polyfluoronitrosoalkane with a 1,1-di-fluoroallene at a temperature between about −40° to 100° C. and at a pressure between about 0.25 to 50 atmospheres, said reactants being in a mole ratio between 10:1 and 1:10.

6. The process of reacting essentially one mole of trifluoronitrosomethane with essentially one mole of perfluoroallene at a temperature between about −20° and +20° C. and at a pressure between about one and 20 atmospheres.

References Cited
UNITED STATES PATENTS 3,072,592   1/1963   Crawford _____ 260—92.1

JOSEPH L. SCHOFER, *Primary Examiner.*

J. A. DONAHUE, M. L. BERCH, *Assistant Examiners.*